United States Patent [19]

Roeder

[11] 4,046,491
[45] Sept. 6, 1977

[54] TENNIS BALL PRESERVER

[76] Inventor: Malcholm O. Roeder, 402 S. Wayne St., Danville, Ind. 46122

[21] Appl. No.: 651,513

[22] Filed: Jan. 22, 1976

[51] Int. Cl.$^2$ .............. F04B 49/00; B65D 85/00
[52] U.S. Cl. ................... 417/44; 206/315 B
[58] Field of Search .............. 417/44; 206/31 BB; 137/12; 141/4; 53/36, 37

[56] References Cited

U.S. PATENT DOCUMENTS

| 1,207,814 | 12/1916 | Stockton | 53/36 |
| 1,911,125 | 5/1933 | Miller | 206/315 B |
| 3,024,800 | 3/1962 | Lewis | 137/572 |
| 3,415,357 | 12/1968 | Van Natter | 206/315 B |
| 3,581,881 | 3/1969 | Hobb | 206/315 B |
| 3,853,222 | 12/1974 | Helms | 206/315 B |

FOREIGN PATENT DOCUMENTS

| 766,747 | 7/1934 | France | 137/572 |
| 1,054,354 | 2/1954 | France | 417/44 |

Primary Examiner—William L. Freeh
Attorney, Agent, or Firm—Jenkins, Coffey & Hyland

[57] ABSTRACT

An apparatus for batch processing tennis balls for preserving their internal pressurization. The apparatus includes a high pressure reservoir and a lower pressure storage chamber integrally and unitarily housed within a single tank and separated by a bulkhead. An air compressor is connected to the high pressure reservoir and is controlled by a gauge apparatus to maintain a desired high pressure within the reservoir. The reservoir and storage chamber are connected together by a conduit which includes a low pressure regulator to maintain a desired pressure in the storage chamber. A passageway with an air-tight, removable lid provides access to the interior of the low pressure chamber for loading and unloading the tennis balls. The apparatus may also be used to repressurize tennis balls which have lost some of their inflation.

4 Claims, 4 Drawing Figures

TENNIS BALL PRESERVER

This invention relates to an apparatus for restoring and preserving the desired pressurization in tennis balls.

As is well known, the resiliency exhibited by tennis balls is due, at least in part, to the pressurization of the tennis balls during manufacturing. To be suitable for tournament play, tennis balls must be able to meet quite rigid specifications regarding their size, the distance to which they rebound when dropped from a standard height, the amount of deformation they exhibit under an applied standard force, and their surface characteristics. All manufacturers strive to comply with these rigid specifications to insure that the balls they manufacture exhibit the uniformity demanded by serious amateur as well as professional tennis competitors.

A basic problem with tennis balls presently in use is that, as the balls age, they lose pressure. This pressure loss results from the diffusion through the tennis ball surface of whatever gas may be used to inflate tennis balls during manufacture. Partially to combat this loss of pressure, tennis balls have, for some time, been marketed in pressurized canisters, generally three tennis balls to a canister. Of course, once the canister in which the tennis balls have been sold is opened, the tennis balls are removed from their pressurized environment and, as a result of the pressure differential across their surfaces, they begin to be deflated.

The prior art presents many schemes directed toward the preservation of the pressurization in tennis balls after the balls have been removed from the pressurized containers in which they are sold. The following United States patents are representative of prior art solutions to the depressurization problem: U.S. Pat. No. 1,207,814, issued to Frank W. Stockton on Dec. 12, 1916, titled Method for Preserving Tennis Balls or Other Objects Containing Fluid under Pressure; U.S. Pat. No. 1,911,125, issued to Gustave Miller on May 23, 1933 and titled Pressure Ball Container; U.S. Pat. No. 3,415,357, issued to William J. Van Natter on Dec. 10, 1968 and titled Self-Contained Tennis Ball Storage Container and Pressurizing Device; U.S. Pat. No. 3,581,881, issued to James C. Hobbs, II on June 1, 1971 and titled Inflated Container for Balls; and, U.S. Pat. No. 3,853,222, issued to John D. Helms on Dec. 10, 1974 and titled Pressurization Apparatus. A significant drawback of the prior art is that such prior art contemplates pressurization of a very small number of tennis balls, typically, three tennis balls in a container of a configuration similar to the containers in which tennis balls are marketed.

The increasing popularity of tennis and the resultant growth in the offering of group tennis lessons, as well as the burgeoning tennis club industry, have resulted in the use of far more tennis balls than such prior art apparatus can economically preserve. For example, it is not uncommon for a tennis club in a large metropolitan area to use 10,000 or more tennis balls in a year. While many of the tennis balls may be retired because their surfaces have become worn beyond acceptable limits, many more tennis balls are retired simply because they have lost their pressurization. "Batch" processing of tennis balls to preserve their pressurization is a real and immediate solution, resulting in significant economy, to users of large numbers of tennis balls. As used in this specification and in the claims appended hereto, batch processing refers to the processing of, for example, 200 or more tennis balls at one time to preserve their pressurization.

It is thus an object of the present invention to provide an apparatus which can be economically operated to batch process tennis balls in order to preserve their pressurization, thereby significantly increasing their longevity.

It is a further object of the present invention to provide such an apparatus which may be used not only to preserve the pressurization of tennis balls, but also to repressurize tennis balls which have lost a significant amount of their original pressurization.

A further object of the present invention is to provide an apparatus for storing tennis balls for preserving their internal pressurization, the apparatus comprising means providing an integral housing for a high pressure reservoir and a lower pressure chamber for storage and repressurization of the tennis balls, means for providing compressed air to the high pressure reservoir, means for coupling the low pressure chamber to the high pressure reservoir, means for regulating the flow of compressed air through the coupling means, and means for providing access to the low pressure chamber for placing tennis balls into, and removing tennis balls from, the low pressure chamber. The low pressure chamber and high pressure reservoir are desirably integrally housed.

A further object of the present invention is to provide such an apparatus in which the integral housing is an upstanding tank including an internal bulkhead partitioning the tank into an upper portion and a lower portion, the upper portion comprising the low pressure chamber and the lower portion comprising the high pressure reservoir.

An additional object of the present invention is to provide an apparatus for storing tennis balls in a pressurized environment to preserve their pressurization, the apparatus comprising means for providing a high pressure reservoir, means for providing a lower pressure storage chamber having an access door for entry and removal of tennis balls therefrom, means for providing compressed air to the reservoir, means for providing flow of compressed air from the reservoir to the storage chamber and for regulating the flow to maintain a substantially constant predetermined pressure in the storage chamber, wherein the storage chamber is proportioned and designed for bulk processing of tennis balls, and the reservoir and compressor are proportioned and designed to be sufficient to maintain constant pressure in the storage chamber for such batch processing.

Other and further objects of the present invention will become obvious to those skilled in the art to which the invention pertains by reference to the following description and the accompanying drawings of which:

Figure 1:
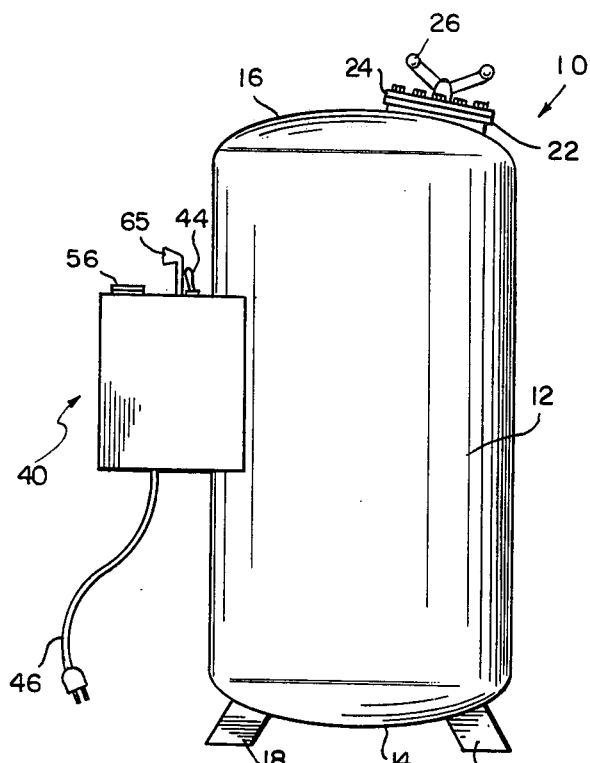
FIG. 1 is a side elevation of the present invention.
Figure 3:
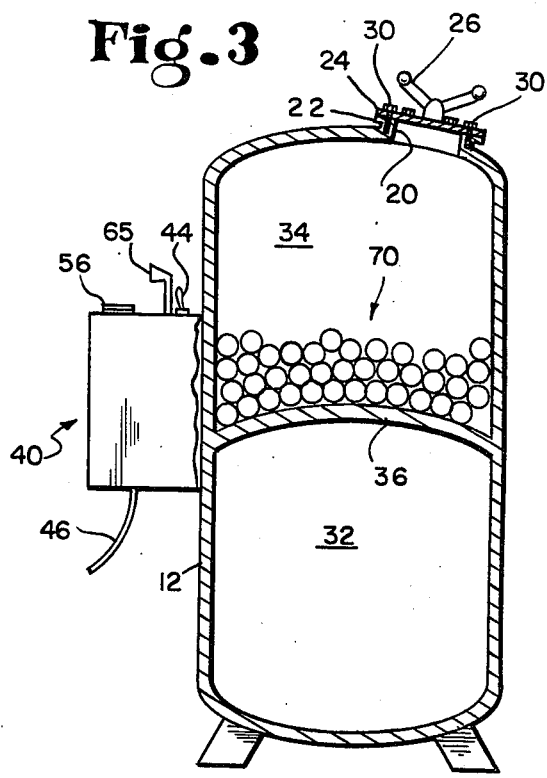
FIG. 3 is a sectional view of the invention taken along section lines 3—3 of FIG. 2.
Figure 2:
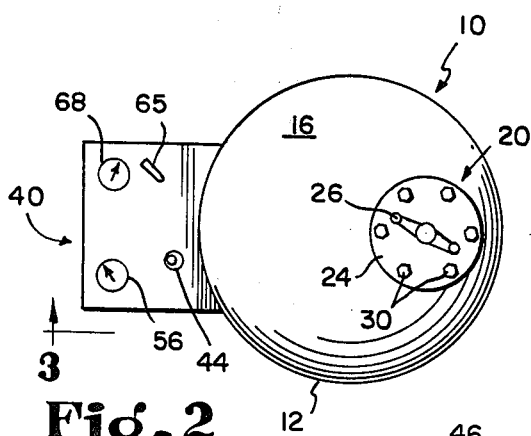
FIG. 2 is a top plan view of the present invention.
Figure 4:
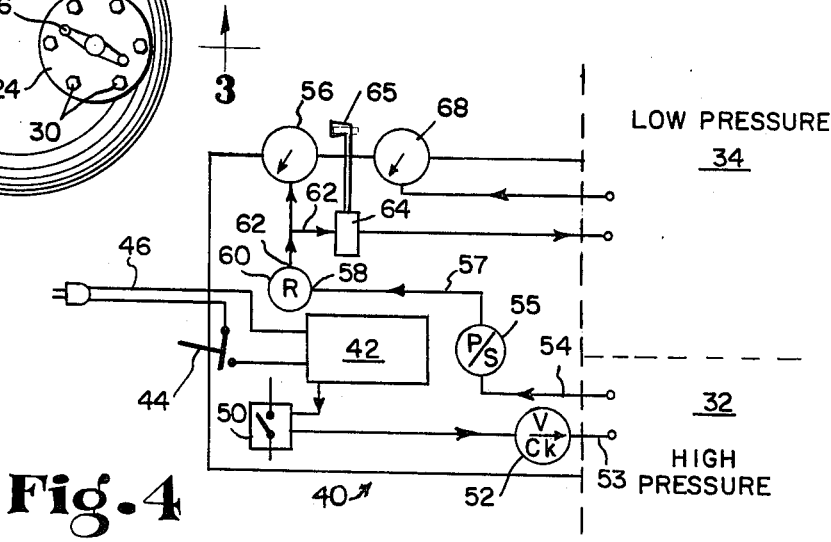
FIG. 4 is a diagrammatic view of certain components of the present invention.

The illustrative tennis ball preserving and pressurizing apparatus includes a housing 10 having a generally cylindrical side wall 12, a bottom 14 and a top 16. Tank 10 stands upon legs 18. At the top of the tank is an access way 20. An annular outer lip 22 is formed at the top of access way 20 and a cover 24 with a handle 26 affixed to the center thereof is removably attached to lip 22 by a plurality of bolts 30.

Internally, tank 10 is divided into a high pressure reservoir 32 and a lower pressure storage chamber 34 by an impermeable bulkhead 36. The entire tank 10, including access way 20 and bulkhead 36 may be constructed of, for example, heavy gauge steel. The high pressure reservoir 32 must be suitably constructed to withstand a relatively high pressure. Storage chamber 34 and the hardware 24,30 for closing access way 20 must be suitably designed to withstand a relatively lower pressure on the order of 12-15 pounds per square inch (psi) above atmospheric pressure. Bulkhead 36 must be suitably attached to the interior of side wall 12 to withstand the same pressure as the high pressure reservoir.

A generally rectangular housing 40 is attached to the side of tank 10. Housing 40 encloses and supports an electrically driven air compressor 42 which is energized from a switch 44 on top of housing 40 and which is supplied with electricity through a line cord 46 from a suitable outlet. Compressor 42 supplies compressed air through a series solenoid 50 and check valve 52 and a conduit 53 to high pressure reservoir 32. Air is supplied through a conduit 54 to a pressure switch 55 and high pressure gauge 56. Pressure gauge 56 continuously monitors the pressure in reservoir 32. Compressor 42 may be set to energize at any desired pressure in reservoir 32 by adjusting pressure switch 55.

A conduit 57 is coupled between pressure switch 55 and an input terminal 58 of a pressure regulator 60. The output terminal 62 of regulator 60 is coupled through a valve 64 to low pressure storage chamber 34. Valve 64 is controllable from a handle 65 on the outside of housing 40. A low pressure gauge 68 is connected to low pressure storage chamber 34 to register the pressure therein.

In operation, valve 64 is first closed preventing air from flowing from reservoir 32 to storage chamber 34. Access way 20 is then opened by removing bolts 30 from closure 24. A batch of tennis balls 70 is then placed in storage chamber 34. Lid 24 is replaced upon the tank, care being taken to insure that lip 22 and lid 24 are properly aligned. Bolts 30 are then replaced to insure that chamber 34 is air tight.

Valve 64 is opened by manipulating handle 65 and switch 44 is thrown. Compressor 42 begins to operate to control the pressure in reservoir 32 at some preselected setting. Typically, compressor 42 will be set to maintain the maximum amount of pressure in reservoir 32 that the compressor can supply. Similarly, regulator 60 begins to function to insure that the pressure in chamber 34 is approximately equal to the normal inflation pressure of tennis balls 70, i.e., 12-15 psi. The equalization of the pressure within and without tennis balls 70 prevents the tennis balls from becoming deflated. Chamber 34, of course, is sufficiently large that a significant number of tennis balls, e.g., 1,000, may be stored therein. This number of tennis balls may represent a significant portion of the inventory of a large user of tennis balls, such as, for example, a tennis club. Therefore, the longevity of the tennis balls used from day to day by the club may be increased dramatically. Tests have shown that the lifetimes of tennis balls stored under pressure in the apparatus of the present invention may be increased fivefold.

Of course, even tennis balls which show a significant amount of wear and depressurization may be stored in the apparatus of the present invention. Depending upon the wear, the amount of depressurization and the age of the ball, a tennis ball may be repressurized and thereby reconditioned for play. Under such circumstances, it may be necessary to increase the pressure setting of regulator 60, thereby increasing the pressure within low pressure chamber 34 in order to achieve sufficient reinflation of old tennis balls within a reasonable period of time. The extent to which the present invention increases the longevity of old tennis balls may be somewhat less than that of new tennis balls stored in the inventive apparatus for the reason that, as the materials from which the tennis balls are made age, the surfaces of the tennis balls become more porous, thereby allowing the inflating gas to escape from the tennis balls more readily. However, significant results can still be achieved, even with old tennis balls.

It can be seen that the apparatus of the present invention provides means for significantly improving the longevity of tennis balls stored therein, and for rejuvenating tennis balls which have lost some of their resiliency. The instant apparatus is capable of batch processing substantial numbers of tennis balls, as required by many tennis clubs, metropolitan parks and recreational departments, and like organizations which use large quantities of tennis balls.

Of course, the illustrated device may be used to preserve the pressurization of other types of sport balls which can be inflated and preserved in the same manner as tennis balls. Thus the device is not limited to tennis balls exclusively but may be used to preserve, for example, squash balls, racquet balls, etc.

What is claimed is:

1. An apparatus for storing tennis balls for preserving their internal pressurization comprising housing means providing a high pressure reservoir and a low pressure chamber for storage of said tennis balls, means for coupling said low pressure chamber to said high pressure reservoir, means for providing compressed air to said high pressure reservoir, means for regulating the flow of compressed air through said coupling means, means for providing access to said low pressure chamber for placing said tennis balls in, and removing said tennis balls from, said low pressure chamber, said low pressure chamber means and high pressure reservoir being integrally and unitarily housed by said housing means.

2. The apparatus of claim 1 wherein said housing means includes an upstanding tank, an internal bulkhead for partitioning said tank into an upper portion and a lower portion, said upper portion providing said low pressure chamber and said lower portion providing said high pressure reservoir.

3. The apparatus of claim 2 including second housing means for housing said means for providing compressed air, said means coupling said low pressure chamber and high pressure reservoir and said means for regulating pressurized air flow therebetween, said second housing means being mounted on said tank.

4. An apparatus for storing tennis balls in a pressurized environment to preserve their pressurization comprising a tank defining an interior, a bulkhead for dividing the interior into a high pressure reservoir and a lower pressure storage chamber having an access door for entry and removal of tennis balls therefrom, a compressor for supplying compressed air to said reservoir, means for providing compressed air flow from said reservoir to said storage chamber and means for regulating said flow to insure substantially constant pressure in said storage chamber, said storage chamber being proportioned and designed to batch process tennis balls and said reservoir and compressor means having capacities sufficient to maintain said constant pressure in said storage chamber.

* * * * *